US011501101B1

(12) United States Patent
Ganesan et al.

(10) Patent No.: US 11,501,101 B1
(45) Date of Patent: Nov. 15, 2022

(54) SYSTEMS AND METHODS FOR SECURING MACHINE LEARNING MODELS

(71) Applicant: NTT DATA Services, LLC, Plano, TX (US)

(72) Inventors: Dhurai Ganesan, Chennai (IN); Aananthanarayanan Pandian, Chennai (IN); Angelene Ravichandran, Chromepet (IN); Harsh Vinayak, Gurgaon (IN); Tanvir Khan, Allen, TX (US)

(73) Assignee: NTT DATA Services, LLC, Plano, TX (US)

( * ) Notice: Subject to any disclaimer, the term of this patent is extended or adjusted under 35 U.S.C. 154(b) by 493 days.

(21) Appl. No.: 16/715,233

(22) Filed: Dec. 16, 2019

(51) Int. Cl.
*G06K 9/62* (2022.01)
*G06N 20/00* (2019.01)

(52) U.S. Cl.
CPC ......... *G06K 9/6223* (2013.01); *G06K 9/6201* (2013.01); *G06K 9/6262* (2013.01); *G06N 20/00* (2019.01)

(58) Field of Classification Search
CPC .................................................. G06K 9/6223
See application file for complete search history.

(56) References Cited

U.S. PATENT DOCUMENTS

| 11,206,279 | B2* | 12/2021 | Dada | G06N 20/10 |
|---|---|---|---|---|
| 11,206,280 | B2* | 12/2021 | Dada | G06Q 20/02 |
| 11,361,434 | B2* | 6/2022 | Corredor | A61B 1/227 |
| 2012/0253927 | A1* | 10/2012 | Qin | G06Q 30/0241 |
| | | | | 705/14.49 |
| 2013/0346347 | A1* | 12/2013 | Patterson | H04M 1/72454 |
| | | | | 706/12 |
| 2014/0046879 | A1* | 2/2014 | MacLennan | G06Q 10/067 |
| | | | | 706/12 |
| 2015/0379423 | A1* | 12/2015 | Dirac | G06N 20/00 |
| | | | | 706/12 |
| 2015/0379425 | A1* | 12/2015 | Dirac | G06N 20/00 |
| | | | | 706/12 |

(Continued)

OTHER PUBLICATIONS

Kumar, Ajitesh, "QA: Blackbox Testing for Machine Learning Models," DZone, Sep. 4, 2018, pp. 1-5.

(Continued)

*Primary Examiner* — Irfan Habib
(74) *Attorney, Agent, or Firm* — Shackelford, Bowen, McKinley & Norton, LLP

(57) ABSTRACT

In an embodiment, a method is performed by a computer system and includes intercepting machine learning (ML) input data before the ML input data flows into a ML model. The method also includes scanning the ML input data against a plurality of ML threat signatures, the scanning yielding at least a first result. The method also includes examining a correlation between values of first and second variables in the ML input data, the examining yielding at least a second result. The method also includes validating at least one of the first and second results via a variability analysis of error instances in the ML input data, the validating yielding at least a third result. The method also includes applying thresholding to the ML input data via the third result, where the applying thresholding results in at least a portion of the ML input data being filtered.

20 Claims, 8 Drawing Sheets

(56) References Cited

U.S. PATENT DOCUMENTS

| | | | | |
|---|---|---|---|---|
| 2015/0379426 | A1* | 12/2015 | Steele | G06N 5/025 706/12 |
| 2020/0210899 | A1* | 7/2020 | Guo | G06N 20/00 |
| 2021/0174192 | A1* | 6/2021 | Zare | G06Q 30/0203 |
| 2021/0383197 | A1* | 12/2021 | Da Silva | G06K 9/6223 |

OTHER PUBLICATIONS

Pico, Alexander, "Pathways4Life: Crowdsourcing Pathway Modeling from Published Figures," Thinklab, 2015, pp. 1-17.

Wikipedia, "Pearson correlation coefficient," Retrieved from https://en.wikipedia.org/w/index.php?title=Pearson_coefficent&oldid=930299690, Dec. 11, 2019, pp. 1-13.

Lewinson, Eryk, "Outlier Detection with Isolation Forest," Jul. 2, 2018, pp. 1-7.

Fei Tony Liu et al., "Isolation Forest," Zhi-Hua Zhou National Key Laboratory for Novel Software Technology, Nanjing University, Nanjing 210093, China, zhouzh@lamda.nju.edu.cn, Conference Paper, Jan. 2009, IEEE Xplore, pp. 1-11.

Wikipedia, "Heteroscedasticity," https://en.wikipedia.org/w/index.php?title=Heteroscedasticity&oldid=925009623, Nov. 7, 2019, pp. 1-7.

Wikipedia, "Breusch-Pagan test," "https://en.wikipedia.org/w/index.php?title=Breusch-Pagan_test&oldid=922696440," Oct. 23, 2019, pp. 1-4.

Wikipedia, "Bootstrapping (statistics)," "https://en.wikipedia.org/w/index.php?title=Bootstrapping_(Statistics)&oldid=930596093," Dec. 13, 2019, pp. 1-15.

Wikipedia, "Adversarial machine learning," "https://en/wikipedia.org/w/index.php?title=Adversarial_machine_learning&oldid=922749689," Oct. 242, 2019, pp. 1-7.

Bumrungsak Phuenaree, "An Interval Estimation of Pearson's Correlation Coefficient by Bootstrap Methods," Asian Journal of Applied Sciences (ISSN: 2321-0893), vol. 05—Issue 03 Jun. 2017, pp. 1-5.

Chakraborty, Anirban et al., "Adversarial Attacks and Defences: A Survey," ACM Comput. Surv.x, x, Article x (x), pp. 1-31, https://doi.org/10.1145/nnnnnnn.nnnnnnn., arXiv:1810.00069v1 [cs.LG] Sep. 28, 2018.

Jagielski, Matthew et al., "Manipulating Machine Learning: Poisoning Attacks and Countermeasures for Regression Learning," arXiv:1804.00308v1 [cs.CR] Apr. 1, 2018, pp. 1-17.

* cited by examiner

SYSTEMS AND METHODS FOR SECURING MACHINE LEARNING MODELS

BACKGROUND

Technical Field

The present disclosure relates generally to machine learning and more particularly, but not by way of limitation, to systems and methods for securing machine learning models.

History of Related Art

The availability of big datasets and increased advancement in machine learning algorithms have paved a way for complex array of solutions across broad industrial spectrums such as insurance and finance. However, this success has been achieved without solving a greater challenge—security with regard to data flowing into machine learning models.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, in an embodiment, a method of securing one or more machine learning models is performed by a computer system and includes intercepting machine learning (ML) input data before the ML input data flows into a ML model. The method also includes scanning the ML input data against a plurality of ML threat signatures, the scanning yielding at least a first result. The method also includes examining a correlation between values of first and second variables in the ML input data, the examining yielding at least a second result. The method also includes validating at least one of the first and second results via a variability analysis of error instances in the ML input data, the validating yielding at least a third result. The method also includes applying thresholding to the ML input data via the third result, where the applying thresholding results in at least a portion of the ML input data being filtered. Other embodiments of this aspect include corresponding computer systems, apparatus, and computer programs recorded on one or more computer storage devices, each configured to perform the actions of the methods.

In another general aspect, in an embodiment, a system includes a processor and memory, where the processor and memory in combination are operable to implement a method. The method includes intercepting machine learning (ML) input data before the ML input data flows into a ML model. The method also includes scanning the ML input data against a plurality of ML threat signatures, the scanning yielding at least a first result. The method also includes examining a correlation between values of first and second variables in the ML input data, the examining yielding at least a second result. The method also includes validating at least one of the first and second results via a variability analysis of error instances in the ML input data, the validating yielding at least a third result. The method also includes applying thresholding to the ML input data via the third result, where the applying thresholding results in at least a portion of the ML input data being filtered.

In another general aspect, in an embodiment, a computer-program product includes a non-transitory computer-usable medium having computer-readable program code embodied therein, the computer-readable program code adapted to be executed to implement a method. The method includes intercepting machine learning (ML) input data before the ML input data flows into a ML model. The method also includes scanning the ML input data against a plurality of ML threat signatures, the scanning yielding at least a first result. The method also includes examining a correlation between values of first and second variables in the ML input data, the examining yielding at least a second result. The method also includes validating at least one of the first and second results via a variability analysis of error instances in the ML input data, the validating yielding at least a third result. The method also includes applying thresholding to the ML input data via the third result, where the applying thresholding results in at least a portion of the ML input data being filtered.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
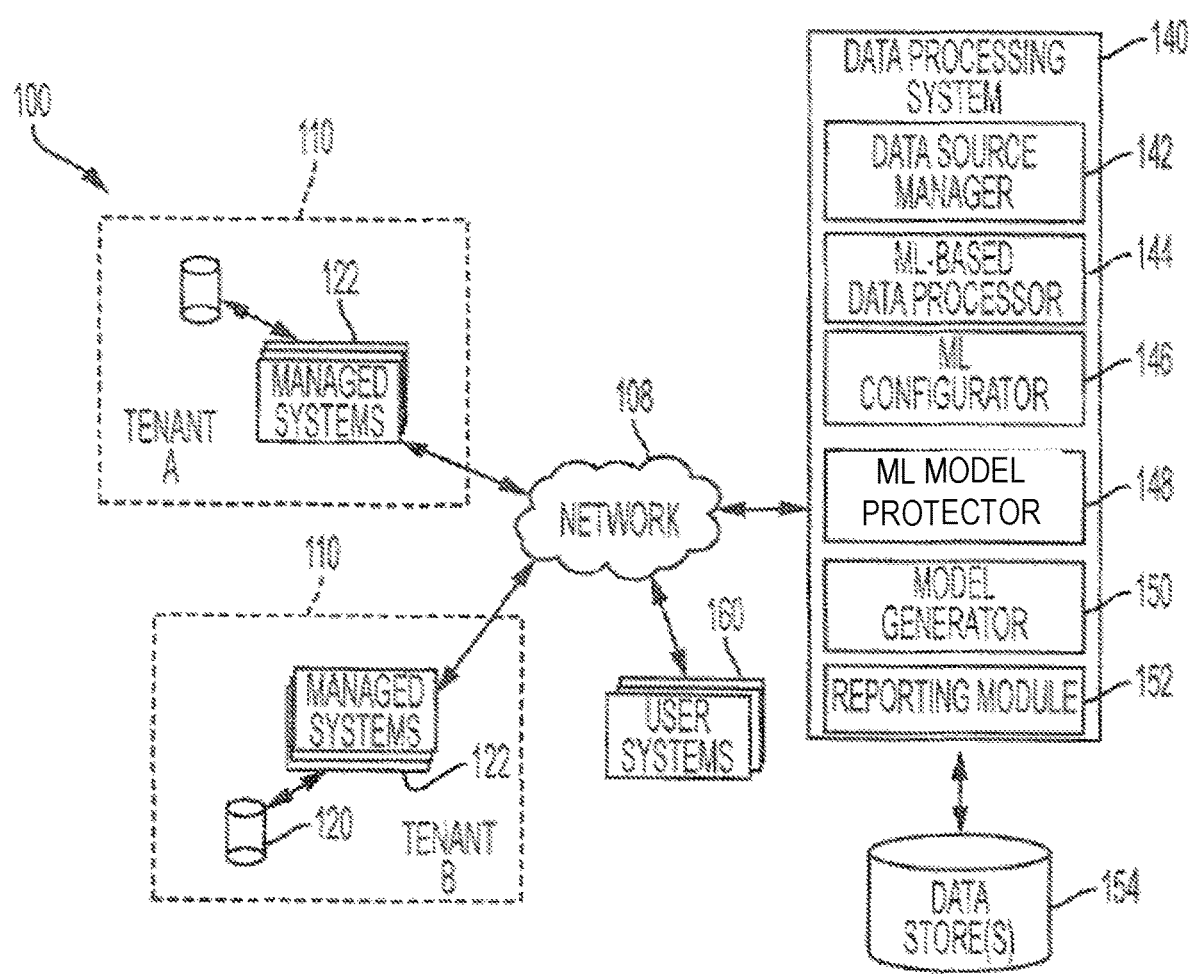
FIG. 1 illustrates an example computing environment for implementing a data processing system.

In certain embodiments, data processing can occur via one or more machine learning (ML) algorithms that are applied to incoming data streams. In various cases, the data processing can involve performing particular tasks with respect to the incoming data streams. The particular tasks can involve, for example, predicting data, generating new data, performing configurable workflows, combinations of the foregoing and/or the like. ML can use various techniques to learn to perform the particular tasks, without being explicitly programmed for the tasks, in some cases using training data that is of a same format as the incoming data stream. In general, ML can encompass various types of algorithms such as, for example, decision tree learning, association rule learning, artificial neural networks (including deep learning and, in particular, feed forward networks), inductive logic programming, support vector machines, clustering, Bayesian networks, reinforcement learning, representation learning, similarity and metric learning, sparse dictionary learning, genetic algorithms, rule-based ML, gradient boosting, ML based on generalized linear modeling, random forest, ensemble learning, combinations of the foregoing and/or the like.

Problematically, different types of attack vectors exist for ML models. In the case of evasion attacks, for example, malicious data samples are modified at test time to evade detection and cause misclassification. For instance, spammers and hackers often attempt to evade detection by obfuscating the content of spam emails and malware code. A particular example of evasion is image-based spam in which the spam content is embedded within an attached image to evade the textual analysis performed by anti-spam filters. Another example of evasion is given by spoofing attacks against biometric verification systems.

As further examples of attack vectors, ML algorithms are often re-trained on data collected during operation to adapt to changes in the underlying data distribution. For instance, intrusion detection systems are often re-trained on a set of samples collected during network operation. Within this scenario, an attacker may poison the training data by injecting carefully designed samples to eventually compromise the whole learning process. Poisoning may thus be regarded as an adversarial contamination of the training data. A particular example is that of an adversarial stop signs, i.e., stop signs that look normal to the human eye but are classified as non-stop signs, for example, by neural networks.

The present disclosure describes examples of providing security against attacks on ML models via interception and pre-processing of ML data before the ML data flows into the ML models for training or other purposes. In various embodiments, training data or and/or other data flowing into an ML model, referred to periodically herein as ML data, can be intercepted by a ML model protection module on a data processing system. In certain embodiments, input data can be configurably scanned and processed by the ML model protection module and only allowed to pass or flow into a given ML model if so allowed by the ML model protection module. In certain cases, the input data can be determined to include a combination of data deemed safe and data deemed unsafe or malicious, whereby the data deemed unsafe or malicious data is filtered from the input data before flowing into the given ML model. In this way, data processing of incoming data streams can be demonstrably improved in accuracy and effectiveness, as attacks that could potentially cause incorrect data processing can be averted.

FIG. 1 illustrates an example computing environment 100 for implementing a data processing system 140. The computing environment 100 includes the data processing system 140, tenant systems 110, user systems 160 and data store(s) 154, each of which is operable to communicate over a network 108. The network 108 may be a private network, a public network, a local or wide area network, a portion of the Internet, combinations of the same, and/or the like.

In certain embodiments, the data processing system 140 can centrally manage ML-based data processing of data sources for its tenants. In particular, in the computing environment 100, the tenant systems 110 can be served by the data processing system 140. The tenant systems 110 shown can be owned or operated by the same or different entities. For example, one of the tenant systems 110 is shown as owned or operated by "Tenant A" while another system 110 is owned or operated by a different tenant, "Tenant B." The tenant systems 110 shown can be owned or operated by the same or different entities. For example, Tenants A and B can represent customers (e.g., entities such as companies or individuals) of an operator of the data processing system 140. Although the term "tenant" is used herein to describe the systems 110 or owners/operators thereof, in addition to having its ordinary meaning, the term "tenant" can, but need not, refer to tenancy in a multitenant software architecture.

More specifically, the tenant systems 110 can include one or more computer systems 122 that are each communicably coupled to, or include, one or more managed data sources 120. The one or more managed data sources 120 can include data streams or datasets that can be processed by the data processing system 140. In various cases, the one or more data sources 120 can be updated by the computer systems 122, or other components, in real-time, on a periodic basis, e.g., according to a schedule, on-demand or a combination of the same.

In the illustrated embodiment, the data processing system 140 can include a data source manager 142, an ML-based data processor 144, an ML configurator 146, a ML model protector 148, a model generator 150 and a reporting module 152. Each of these components can be implemented with hardware and/or software, including (optionally) virtual machines. In an example, the data processing system 140 can be implemented as a single management server. In another example, the data processing system 140 can be implemented in a plurality of virtual or physical servers, which may or may not be geographically co-located. In some embodiments, the data processing system 140 and/or other aspects of the computing environment 100 may be hosted on a cloud-provider system such as the Azure™ service provided by Microsoft® or the EC2™ platform provided by Amazon®.

In certain embodiments, features of the components of the data processing system 140 can be made accessible over an interface to the user systems 160. The user systems 160 can include any type of computing device, including computer systems such as desktops, laptops, tablets, smartphones, and wearable or body-borne computers, to name a few. The user systems 160 can be operated by users associated with the tenants or by other users.

The data source manager 142 can coordinate the managed data sources 120. In various embodiments, the data source manager 142 can identify, receive, pull, and/or communicate with the computer systems 122 so as to enable processing of the managed data sources 120. In some embodiments, the data source manager 142 can serve a data collection function. In these embodiments, the computer systems 122 can obtain or collect datasets in real-time, periodically, e.g., according to a schedule, on-demand, or a combination of the same. In some cases, such datasets can be provided as a live stream. In some cases, data from the managed data sources 120 can be collected and stored in the data store(s) 154. In other cases, the data can remain at the managed data sources 120.

The ML-based data processor 144 can process data according to a plurality of ML algorithms supported thereby, potentially using different ML models, representative of different configuration settings and/or ML algorithms, for different data sources. The processing performed by the ML-based data processor 144 can involve executing particular tasks with respect to the data such as, for example, data prediction, generation of new data, execution of configurable workflows, combinations of the foregoing and/or the like. For illustrative purposes, examples will be described herein relative to data prediction. A particular ML model that is used for each of the managed data sources 120 can be maintained by the ML-based data processor 144 and stored, for example, in data store(s) 154. As described in greater detail below, the particular ML model that is used for each of the managed data sources can be configurable and effected via, for example, operation of the ML configurator 146.

The ML configurator 146 can interact with the model generator 150 to individually adapt ML-based data processing to individual characteristics of each of the managed data sources 120. For example, at a time of instituting ML-based data processing of each managed data source of the managed data sources 120, or at any other time that may be desirable in a given implementation, the ML configurator 146 can receive, or identify, a training dataset that is representative of data to be provided by the managed data source and processed by the ML-based data processor 144. For any given managed data source of the managed data sources 120, the ML configurator 146 can use the model generator 150 to generate, and specially configure, candidate ML models for the given managed data source using the training dataset.

In a typical embodiment, the candidate ML models generated and specially configured by the model generator 150 can include one or more candidate models for each of the plurality of ML models supported by the ML-based data processor 144. In certain embodiments, the ML configurator 146 can automatically identify, or select, a particular ML model, from among the plurality of candidate ML models, to apply to the given managed data source. In various cases, the particular ML model that is identified and applied can be a model that is deemed best or optimal based on a configurable standard. For example, in certain embodiments, the ML configurator 146 and/or the model generator 150 can measure an accuracy or effectiveness of the candidate ML models using a withheld portion of the training dataset, and then select a most-accurate candidate model. In this way, in certain implementations, the ML configurator 146 can apply, to each of the managed data sources 120, a particularly advantageous ML model from among the one or more ML models, thereby demonstrably improving the efficiency, effectiveness and accuracy of the ML-based data processing performed by the ML-based data processor 144.

In certain embodiments, the ML configurator 146 can be triggered whenever it is desirable to determine or select an ML algorithm for the managed data sources 120. In some cases, the ML configurator 146 can be automatically triggered whenever a new data source is added to the managed data sources 120. In other cases, the ML configurator 146 can be manually triggered or triggered on a periodic basis to re-evaluate how ML-based data processing is occurring with respect to some or all of the managed data sources 120. For example, in certain embodiments, the ML configurator 146 can publish a configuration interface to the user systems 160, for example, for administrators, super users or other users (e.g., of a particular tenant) to select or specify commands for initiating and/or providing data related to operation of the ML configurator 146. The data store(s) 154 can store ML frameworks that implement the ML algorithms, configuration settings of ML models and/or ML frameworks, and/or other data used by the ML configurator 146, the ML model protector 148, the model generator 150 and/or other components of the computing environment 100.

The ML model protector 148 can provide security to models generated or configured via the data processing system 140. In various embodiments, the ML model protector 148 intercepts input data flowing into a given model, inclusive of initial training data for model creation and later training data after the given model is in use in production. The ML model protector 148 can include multiple modules or engines that process the input data using multiple types of algorithms to ensure data validity. An example of the ML model protector 148 will be described relative to FIG. 3.

The reporting module 152 can generate regular or on-demand reports related to the ML-based data processor 144, the ML configurator 146, the ML model protector 148, the model generator 150 and/or any other component of the computing environment. The reporting module 152 can publish reports or other generated information, for example, to a web page, dashboard, and/or the like. The reporting module 152 can also generate and execute a query of the data store(s) 154. The web page, user dashboard or other user interface(s) output, for example, by the reporting module 152, can be accessed by users of the user systems 160. The reporting module 152 can also provide a user interface, for instance, that allows the users of the user systems 160 to obtain customized data related to any data maintained by the data store(s) 154.

In general, the data store(s) 154 can include any information collected, stored, used, produced and/or output by the data processing system 140 or a component thereof. For example, in various embodiments, the data store(s) 154 can include ML models, ML frameworks, identification of ML models used for particular managed data sources of the managed data sources 120, software, training datasets, ML threat signatures, data collected or received from the managed data sources 120, data processed by the ML-based data processor 144, combinations of the same and/or the like. In certain embodiments, data stored in the data store(s) 154 can take the form of repositories, flat files, databases, etc.

Figure 2:
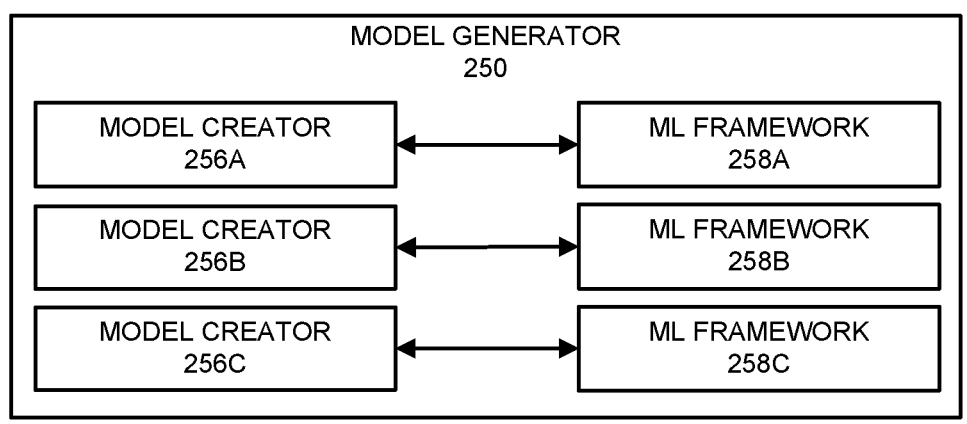
FIG. 2 illustrates an example of a model generator.

FIG. 2 illustrates an example of a model generator 250. In general, the model generator 250 can function as described with respect to the model generator 150 of FIG. 1. The model generator 250 is shown to include model creators 256A, 256B and 256C (collectively, model creators 256) that are operable to create ML models for ML frameworks 258A, 258B and 258C, respectively (collectively, ML frameworks 258). It should be appreciated that the ML frameworks 258 are shown as residing within the model generator 250 for simplicity of illustration and description. In various embodiments, the ML frameworks 258 can exist separately from the model generator 250 and be located outside the model generator 250.

In certain embodiments, each of the ML frameworks 258 can be representative of a distinct ML algorithm that can be used for ML model generation. In an example, the model creator 256A can be used to specially configure ML model generation using the ML framework 258A, for example, by creating configuration settings and testing their accuracy and effectiveness for a given dataset. In similar fashion, the model creators 256B and 256C can be used to specially configure ML model generation using the ML frameworks 258B and 258C, respectively.

Figure 3:
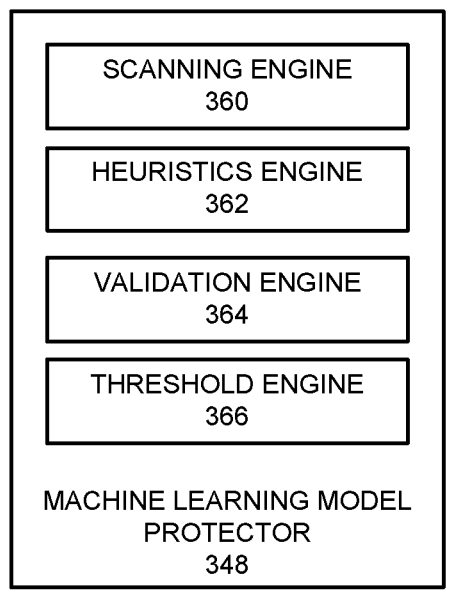
FIG. 3 illustrates an example of a ML model protector.

FIG. 3 illustrates an example of a ML model protector 348. In general, the ML model protector 348 can operate as described relative to the ML model protector 148 of FIG. 1. The ML model protector 348 is shown to include a scanning engine 360, a heuristics engine 362, a validation engine 364 and a threshold engine 366. In general, the scanning engine 360, the heuristics engine 362, the validation engine 364 and the threshold engine 366 collaborate to secure ML models from malicious data. Operation of the ML model protector 348 will be described relative to FIGS. 4-7.

Figure 4:
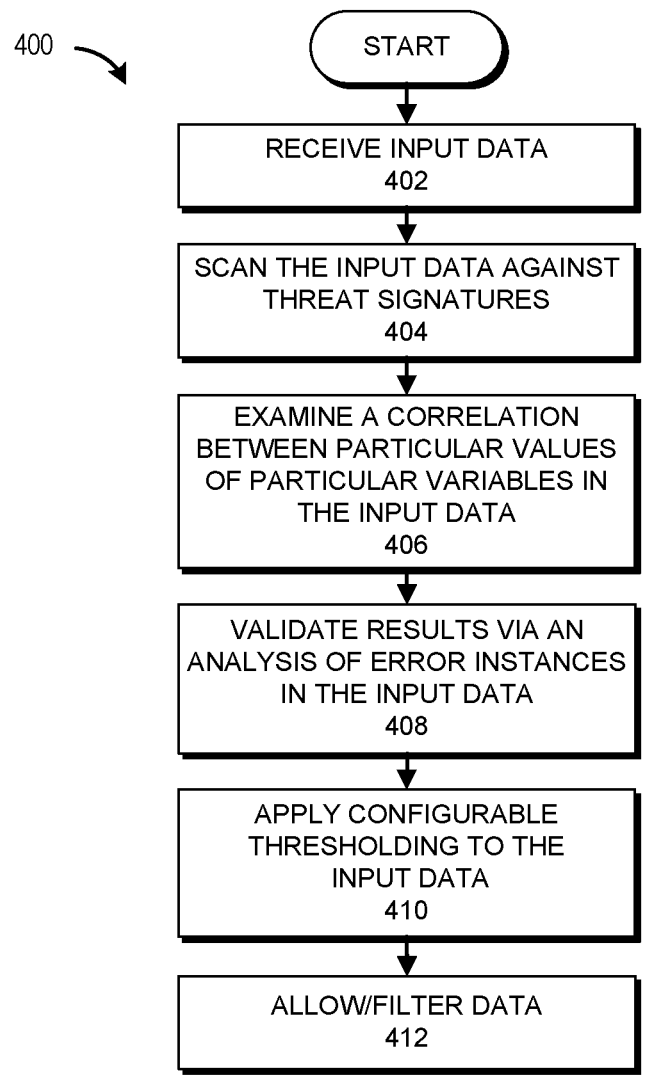
FIG. 4 illustrates an example of a process for securing machine learning models from malicious data.

FIG. 4 illustrates an example of a process 400 for securing ML models from malicious data. In certain embodiments, the process 400 can be executed, for example, by the data source manager 142, the ML-based data processor 144, the ML configurator 146, the ML model protector 148, the model generator 150 and/or the reporting module 152, all of FIG. 1. In other examples, the process 400 can be executed via the ML model protector 348 of FIG. 3 and/or a component thereof, such as the scanning engine 360, the heuristics engine 362, the validation engine 364 and/or the threshold engine 366. The process 400 can also be executed generally by the data processing system 140 of FIG. 1. Although the process 400 can be executed by any number of different components, to simplify discussion, the process 400 will be described relative the ML model protector 348 and specific components thereof.

At block 402, the ML model protector 348 receives input data for a particular ML model. In various cases, the input data can be initial training data for generation of the particular model, training data for re-training of the particular model, user-provided data used as training data for the particular model after it is in production, combinations of the foregoing and/or the like. In certain embodiments, the receipt at the block 402 amounts to interception of the input data before such data is allowed to flow into the particular model.

At block 404, the scanning engine 360 scans the input data against a plurality of ML threat signatures. In a typical embodiment, the plurality of threat signatures each include or define a pattern or distribution of data that is representative of a ML attack vector. In some cases, the plurality of ML threat signatures can result from historical data for the particular model or similar models. The plurality of threat signatures can be stored and maintained, for example, in the data store(s) 154 or other memory. Example functionality that can be performed at the block 404 will be described with respect to FIG. 5.

At block 406, the heuristics engine 362 examines a correlation between particular values of particular variables in the input data. In various embodiments, the correlation from the block 406 can be based on Pearson's correlation coefficient. Example functionality that can be performed at the block 406 will be described with respect to FIG. 6.

At block 408, the validation engine 364 validates results of the blocks 404 and 406 via, for example, an analysis of error instances in the input data. Example functionality that can be performed at the block 408 will be described with respect to FIG. 7.

At block 410, the threshold engine 366 applies configurable thresholding to the input data, using results from the blocks 404, 406 and/or 408, to identify all or a portion of the input data that should be allowed to flow into the particular ML model. In various embodiments, one or more thresholds can be established relative to a type of result produced by the blocks 404, 406 and/or 408, such that the threshold engine 366 can be tuned to be more or less restrictive. In general, the block 410 results in data which does not satisfy the thresholds (or that satisfies the thresholds, as the case may be) being filtered, restricted and/or removed from the input data, or causes such filtering, restriction or removal.

At block 412, the ML model protector 348 allows data which is not filtered or restricted to flow into the particular model for model training, re-training and/or other purposes. In a typical embodiment, the block 412 includes preventing data which is filtered or restricted from flowing into the particular model. In some cases, the data which is filtered or restricted can be stored, for example, in the data store(s) 154 for further analysis. After block 412, the process 400 ends.

Figure 5:
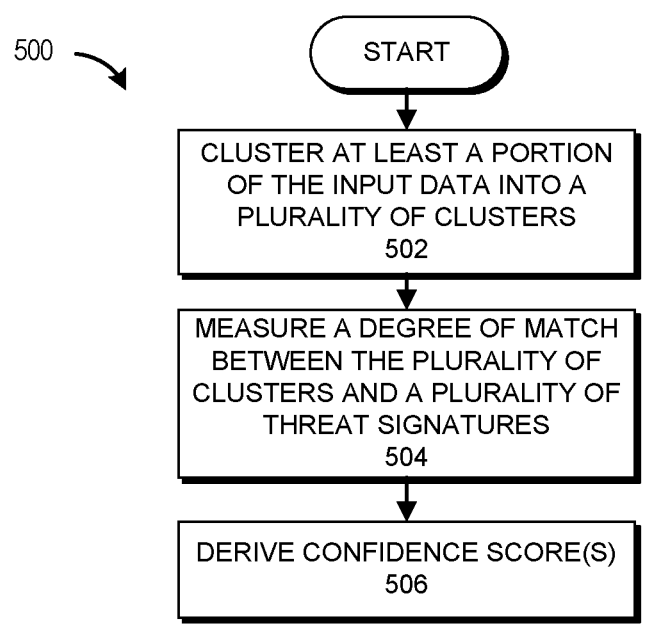
FIG. 5 illustrates an example of a process for scanning input data against a plurality of ML threat signatures.

FIG. 5 illustrates an example of a process 500 for scanning input data against a plurality of ML threat signatures. In certain embodiments, the process 500 can be executed, for example, by the data source manager 142, the ML-based data processor 144, the ML configurator 146, the ML model protector 148, the model generator 150 and/or the reporting module 152, all of FIG. 1. In other examples, the process 500 can be executed via the ML model protector 348 of FIG. 3 and/or a component thereof, such as the scanning engine 360, the heuristics engine 362, the validation engine 364 and/or the threshold engine 366. The process 500 can also be executed generally by the data processing system 140 of FIG. 1. Although the process 500 can be executed by any number of different components, to simplify discussion, the process 500 will be described relative the scanning engine 360 of FIG. 3. In various embodiments, the process 500 can be performed as all or part of the block 404 of FIG. 4.

At block 502, the scanning engine 360 clusters at least a portion of the input data into a plurality of clusters. In various embodiments, the block 502 can include the scanning engine 360 clustering values of any suitable number of variables in the input data according to any suitable number of cluster analysis algorithms. In this way, block 502 can generate, or cause generation of, a multidimensional pattern for values of multiple variables and/or multiple types of clusters, such that the plurality of clusters includes multiple independent sets of clusters. For example, the multidimensional pattern can include a set of clusters for values of one variable, for values of each of two or more variables (i.e., so that there is an independent set of clusters for each variable), etc. By way of further example, for each variable for which clustering is performed, the multidimensional pattern can include a set of clusters according to one cluster analysis algorithm or according to each of two or more cluster analysis algorithms (i.e., so that there is an independent set of clusters for each cluster analysis algorithm).

In a particular example of using two or more cluster analysis algorithms, the block 502 can include the scanning engine 360 clustering according to both k-means clustering and density-based spatial clustering with noise (DBSCAN). The scanning engine 360 can thereby cluster the input data into an independent set of clusters for each algorithm. According to this example, the block 502 can generate, or cause generation of, a multidimensional pattern that includes the plurality of clusters for each of k-means clustering and DBSCAN. The multidimensional pattern, or other cluster information, can be stored in the data store(s) 154 and/or in other memory.

At block 504, the scanning engine 360 measures a degree of match between the plurality of clusters and the plurality of ML threat signatures. In various cases, some ML threat signatures may relate to certain cluster analysis algorithm(s), certain variables or data types, certain combinations of cluster analysis algorithms and/or certain combinations of variables or data types. In these cases, the measuring at the block 504 can include determining a degree of match between clusters (or combinations of clusters) and signatures that are of like kind, for example, in terms of combination of cluster analysis algorithms and/or variables or data types.

At block 506, the scanning engine 360 derives a confidence score that the input data (or a portion thereof) matches the plurality of ML threat signatures. The scanning engine 360 can derive such a confidence score for one, more than one or all of the plurality of ML threat signatures. In an example, in some embodiments, each degree of match for a given ML threat signature (determined at the block 504) can be considered a confirmation, a rejection, or neither a confirmation nor rejection and, accordingly, assigned match values of 1, −1, and 0, respectively. In various embodiments, criteria for confirmation, rejection or neither confirmation nor rejection can be configurable and defined in terms of the degree of match. In these embodiments, the confidence score for the given ML threat signature can be a sum of the determined match values.

More particularly, in some embodiments, isolation trees can be leveraged at the block 506 according to Equation 1, Equation 2 and Equation 3 below. In an example, if the input data is assumed to include n instances, an isolation tree can be built from the n instances, where h(x) of a point x is measured by a number of edges that x traverses an isolation tree from the root node until the traversal is terminated at an external node. Given the set of n instances, c(n), as shown in Equation 1), can represent the average path length of unsuccessful search, where H(i) is the harmonic number as shown in Equation 2. Thus, c(n) can thereby serve to normalize h(x). An anomaly score s(x, n), which can serve as a confidence score, can be computed as shown in Equation 3, where E(h(x)) is the average of h(x) from a collection of isolation trees. In general, for purposes of Equation 3, s(x, n) approaches 0.5 as E(h(x)) approaches c(n), approaches one as E(h(x)) approaches zero, and approaches zero as E(h(x)) approaches (n−1). Generally, with reference to s(x, n), values close to one indicate anomalies, values smaller than 0.5 indicate that it is safe to regard as normal instances, and values of approximately 0.5 indicate that the entire sample does not have a distinct anomaly.

$$c(n) = 2H(n-1) - \left(\frac{2(n-1)}{n}\right) \quad \text{Equation 1}$$

$$H(i) = \ln(i) + 0.5772156649 \quad \text{Equation 2}$$

$$s(x, n) = 2^{\frac{-E(h(x))}{c(n)}} \quad \text{Equation 3}$$

After block 506, the process 500 ends. In various embodiments, the scanning engine 360 can produce results or outputs such as, for example, information related to the plurality of clusters from the block 502, information related to the measured degree of match from the block 504, the confidence score(s) from the block 506 combinations of the foregoing and/or the like.

Figure 6:
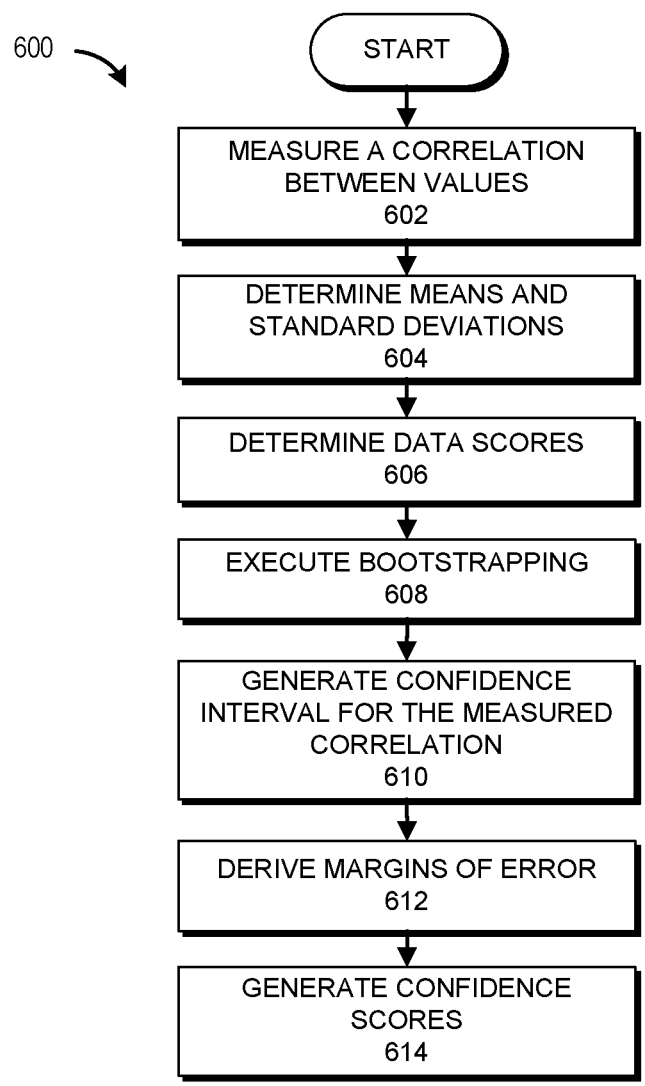
FIG. 6 illustrates an example of a process for examining a correlation between particular values of particular variables in the input data.

FIG. 6 illustrates an example of a process 600 for examining a correlation between particular values of particular variables in the input data. In certain embodiments, the process 600 can be executed, for example, by the data source manager 142, the ML-based data processor 144, the ML configurator 146, the ML model protector 148, the model generator 150 and/or the reporting module 152, all of FIG. 1. In other examples, the process 600 can be executed via the ML model protector 348 of FIG. 3 and/or a component thereof, such as the scanning engine 360, the heuristics engine 362, the validation engine 364 and/or the threshold engine 366. The process 600 can also be executed generally by the data processing system 140 of FIG. 1. Although the process 600 can be executed by any number of different components, to simplify discussion, the process 600 will be described relative the heuristics engine 362 of FIG. 3. In various embodiments, the process 600 can be performed as all or part of the block 406 of FIG. 4.

At block 602, the heuristics engine 362 measures a correlation between values of two variables in the input data. Equation 4 illustrates an example of measuring the correlation using Pearson's correlation coefficient. In Equation 4, Pearson's correlation coefficient R is computed for n pairs of values of two variables, namely, a first variable x and a second variable y, where R is a value between +1 and −1 such that 1 is total positive linear correlation, 0 is no linear correlation and −1 is total negative correlation.

$$R = \frac{n(\sum xy) - (\sum x)(\sum y)}{\sqrt{\left[n\sum x^2 - (\sum x)^2\right]\left[n\sum y^2 - (\sum y)^2\right]}} \quad \text{Equation 4}$$

At block 604, the heuristics engine 362 determines means and standard deviations of the values of the first and second variables in the input data. In various embodiments, a mean $\mu_x$ of the values of the first variable x and a mean $\mu_y$ of the values of the second variable y can be computed as shown in Equation 5 below. In various embodiments, a standard deviation $\sigma_x$ of the values of the first variable x and a standard deviation $\sigma_y$ of the values of the second variable y can be computed as shown in Equation 6 below.

$$\mu_x = \frac{\sum x}{n} \quad \text{Equation 5}$$

$$\mu_y = \frac{\sum y}{n}$$

$$\sigma_x = \sqrt{\frac{\sum_{i=1}^{n}(x_i - \mu_x)^2}{n-1}} \quad \text{Equation 6}$$

$$\sigma_y = \sqrt{\frac{\sum_{i=1}^{n}(y_i - \mu_y)^2}{n-1}}$$

At block 606, the heuristics engine 362 determines data scores for the values of the input data. In an example, the data scores can be determined using Equation 7 below. In the example of Equation 7, the heuristics engine 362 can determine a data score $x_s$ for the values of the first variable x and a data score $y_s$ for the values of the second variable y, where $\varepsilon$ can represent a configurable constant (e.g., 1, 2, 3, etc.).

$$x_s = \mu_x + \varepsilon \sigma_x$$

$$y_s = \mu_y + \varepsilon \sigma_y \quad \text{Equation 7}$$

At block 608, the heuristics engine 362 executes bootstrapping with respect to the input data. In certain embodiments, the block 608 involves successively generating many random samples from the input data with replacement (e.g., 1,000, 10,000, etc.) and measuring, within each random sample, a correlation between values of the two variables. The correlation can be measured in the fashion described above relative to the block 602, such that the block 608 produces a measured correlation according to Equation 4 for each random sample.

At block 610, the heuristics engine 362 generates a confidence interval for the measured correlation from the block 602 based on the bootstrapping from the block 608. For example, the heuristics engine 362 can generate a confidence interval $\alpha$ as shown in Equation 8 below. With reference to Equation 8, $$z_{\frac{R}{2}}$$

and $Z_{R_B}$ can be computed as shown in Equation 9 below by substituting R/2 and $R_B$, respectively, for R. Still with reference to Equation 8, $R_B$ can be computed as shown in Equation 10 below, where B represents a number of random samples produced during the bootstrapping at the block 608.

$$\alpha = \left[\left(R_B - Z_{\frac{R}{2}} Z_{R_B}\right), \left(R_B + Z_{\frac{R}{2}} Z_{R_B}\right)\right] \quad \text{Equation 8}$$

$$Z_R = \frac{1}{2}\ln\left(\frac{1+R}{1-R}\right) \quad \text{Equation 9}$$

$$R_B = \frac{1}{B}\sum_{i=1}^{B} R_i \quad \text{Equation 10}$$

At block 612, the heuristics engine 362 derives margins of error for the values of the two variables in the input data. For example, the heuristics engine 362 can derive a margin of error $M_x$ for the values of the first variable x and a margin of error $M_y$ for the values of the second variable y using Equation 11 below. As illustrated, Equation 11 can utilize the data score $x_s$ and the data score $y_s$ described previously relative to the block 606. Still with reference to Equation 11, $Z_R$ can be computed as described previously relative to Equation 9, where R corresponds to the measured correlation from the block 602.

$$M_x = x_s Z_R$$

$$M_y = y_s Z_R \quad \text{Equation 11}$$

At block 614, the heuristics engine 362 generates confidence scores for the values of the variables in the input data. In certain embodiments, the block 614 can include generating a confidence score $CS_x$ for the values of the first variable x and a confidence score $CS_y$ for the values of the second variable y using Equation 12 below. After block 614, the process 600 ends. In various embodiments, the heuristics engine 362 can produce results or outputs such as, for example, the confidence interval α from the block 610, the margins of error $M_x$ and $M_y$ from the block 612 and/or the confidence scores $CS_x$ and $CS_y$ from the block 614.

$$CS_x = |\mu_x - M_x| - (1.5)\left(\frac{\sigma_x}{100}\right) \quad \text{Equation 12}$$

$$CS_y = |\mu_y - M_y| - (1.5)\left(\frac{\sigma_y}{100}\right)$$

Figure 7:
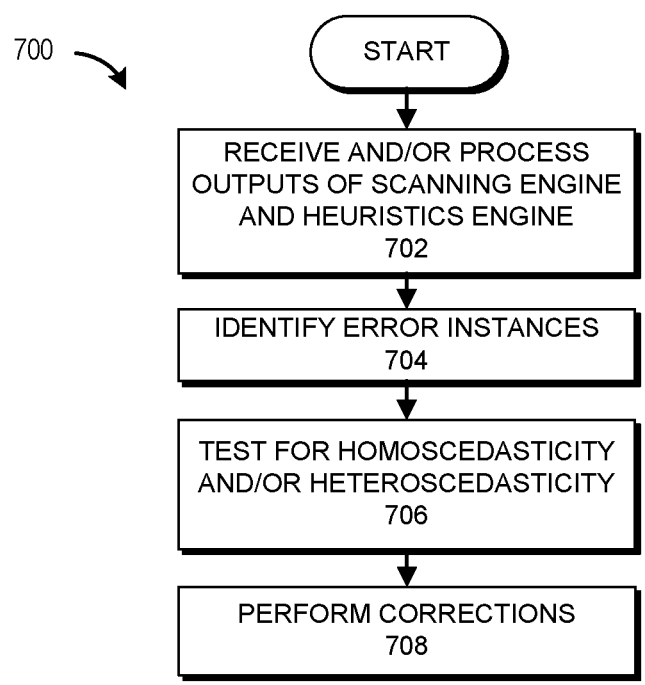
FIG. 7 illustrates an example of a process for validating outputs of a scanning engine and a heuristics engine.

FIG. 7 illustrates an example of a process 700 for validating outputs of the scanning engine 360 and/or the heuristics engine 362 of FIG. 3. In certain embodiments, the process 700 can be executed, for example, by the data source manager 142, the ML-based data processor 144, the ML configurator 146, the ML model protector 148, the model generator 150 and/or the reporting module 152, all of FIG. 1. In other examples, the process 700 can be executed via the ML model protector 348 of FIG. 3 and/or a component thereof, such as the scanning engine 360, the heuristics engine 362, the validation engine 364 and/or the threshold engine 366. The process 700 can also be executed generally by the data processing system 140 of FIG. 1. Although the process 700 can be executed by any number of different components, to simplify discussion, the process 700 will be described relative the validation engine 364 of FIG. 3. In various embodiments, the process 700 can be performed as all or part of the block 408 of FIG. 4.

At block 702, the validation engine 364 receives and/or processes outputs, for example, of the process 500 of FIG. 5 and the process 600 of FIG. 6. In some cases, the block 702 can include consolidating the outputs into a data structure and/or developing one or more composite metrics for particular variables, pairs of variables, combinations of variables that collectively form a data element and/or or for the input data as a whole.

At block 704, the validation engine 364 identifies error instances in the input data using the consolidated outputs of the block 702. In various embodiments, the error instances can be, for example, values for which an applicable confidence score fails to satisfy a threshold. Additionally, or alternatively, the error instances can correspond to outliers in an interquartile range (IQR) for a given set of values. In an example, Q1, Q2 and Q3 can be calculated such that Q1 is a middle number between the smallest value and the median of the given set of values, Q2 is the median of the set of values and Q3 is the middle value between the median and the largest value. According to this example, the IQR can be a difference between Q3 and Q1. Continuing this example, upper outliers can be detected as values that are, for example, greater than a sum of Q3 and 1.5×IQR, where 1.5×IQR represents 1.5 multiplied by the IQR. In similar fashion, lower outliers can be detected as values that are, for example, less than a difference between Q1 and 1.5×IQR, where 1.5×IQR again represents 1.5 multiplied by the IQR. As described previously, the upper and lower outliers can constitute error instances in the input data.

At block 706, the validation engine 364 tests the identified error instances for homoscedasticity and/or heteroscedasticity. In some cases, the test can be performed individually by variable, such that the identified error instances of each given variable are tested for homoscedasticity or heteroscedasticity. In various embodiments, homoscedasticity indicates a constant variance, or no pattern, while heteroscedasticity indicates a pattern. In certain examples, the block 706 can include applying the Breusch-Pagan test. In addition, or alternatively, in some embodiments, Equation 13 below can be used to test for homoscedasticity, where Equation 13 sets forth an assumption that the variance of error term is the same regardless of a predictor variable X. According to this example, if this assumption is violated, heteroscedasticity is determined to be present.

$$\text{Var}(u|X) = \sigma^2 \quad \text{Equation 13}$$

At block 708, particularly in the case of heteroscedasticity, corrections can be performed. In some embodiments, corrections can be applied, for example, by applying an estimator based on weighted least squares and/or heteroscedasticity-consistent standard errors. In some cases, such as particular cases in which all identified error instances are determined to have a pattern consistent with homoscedasticity, the block 708 may be omitted. In certain embodiments, if heteroscedasticity is determined at the block 706, standard error can be computed according to Equation 14 below. After block 708, the process 700 ends.

$$\text{var}(b_2) = \frac{\sum_{i=1}^{N}\left[(x-\bar{x})^2 \sigma^2\right]}{\left[\sum_{i=1}^{N}(x-\bar{x})^2\right]^2} \quad \text{Equation 14}$$

Figure 8:
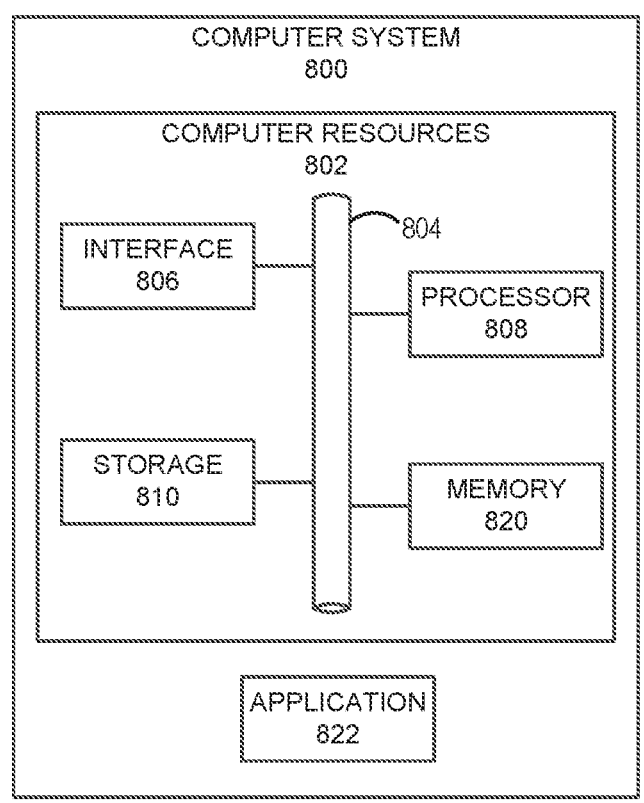
FIG. 8 illustrates an example of a computer system.

FIG. 8 illustrates an example of a computer system 800. In some cases, the computer system 800 can be representative, for example, of any of the tenant systems 110 or components thereof, the user systems 160, and/or the data processing system 140 or components thereof. The computer system 800 includes an application 822 operable to execute on computer resources 802. In particular embodiments, the computer system 800 may perform one or more actions described or illustrated herein. In particular embodiments, one or more computer systems may provide functionality described or illustrated herein. In particular embodiments, encoded software running on one or more computer systems may perform one or more actions described or illustrated herein or provide functionality described or illustrated herein.

The components of the computer system 800 may include any suitable physical form, configuration, number, type and/or layout. As an example, and not by way of limitation, the computer system 800 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 800 may include one or more computer systems; be unitary or distributed; span multiple locations; span multiple machines; or reside in a cloud, which may include one or more cloud components in one or more networks.

In the depicted embodiment, the computer system 800 includes a processor 808, memory 820, storage 810, interface 806 and bus 804. Although a particular computer system is depicted having a particular number of particular components in a particular arrangement, this disclosure contemplates any suitable computer system having any suitable number of any suitable components in any suitable arrangement.

Processor 808 may be a microprocessor, controller, or any other suitable computing device, resource, or combination of hardware, software and/or encoded logic operable to execute, either alone or in conjunction with other components, (e.g., memory 820), the application 822. Such functionality may include providing various features discussed herein. In particular embodiments, processor 808 may include hardware for executing instructions, such as those making up the application 822. As an example, and not by way of limitation, to execute instructions, processor 808 may retrieve (or fetch) instructions from an internal register, an internal cache, memory 820, or storage 810; decode and execute them; and then write one or more results to an internal register, an internal cache, memory 820, or storage 810.

In particular embodiments, processor 808 may include one or more internal caches for data, instructions, or addresses. This disclosure contemplates processor 808 including any suitable number of any suitable internal caches, where appropriate. As an example, and not by way of limitation, processor 808 may include one or more instruction caches, one or more data caches and one or more translation lookaside buffers (TLBs). Instructions in the instruction caches may be copies of instructions in memory 820 or storage 810 and the instruction caches may speed up retrieval of those instructions by processor 808. Data in the data caches may be copies of data in memory 820 or storage 810 for instructions executing at processor 808 to operate on; the results of previous instructions executed at processor 808 for access by subsequent instructions executing at processor 808, or for writing to memory 820, or storage 810; or other suitable data. The data caches may speed up read or write operations by processor 808. The TLBs may speed up virtual-address translations for processor 808. In particular embodiments, processor 808 may include one or more internal registers for data, instructions, or addresses. Depending on the embodiment, processor 808 may include any suitable number of any suitable internal registers, where appropriate. Where appropriate, processor 808 may include one or more arithmetic logic units (ALUs); be a multi-core processor; include one or more processors 808; or any other suitable processor.

Memory 820 may be any form of volatile or non-volatile memory including, without limitation, magnetic media, optical media, random access memory (RAM), read-only memory (ROM), flash memory, removable media, or any other suitable local or remote memory component or components. In particular embodiments, memory 820 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 820 may include one or more memories 820, where appropriate. Memory 820 may store any suitable data or information utilized by the computer system 800, including software embedded in a computer readable medium and/or encoded logic incorporated in hardware or otherwise stored (e.g., firmware). In particular embodiments, memory 820 may include main memory for storing instructions for processor 808 to execute or data for processor 808 to operate on. In particular embodiments, one or more memory management units (MMUs) may reside between processor 808 and memory 820 and facilitate accesses to memory 820 requested by processor 808.

As an example, and not by way of limitation, the computer system 800 may load instructions from storage 810 or another source (such as, for example, another computer system) to memory 820. Processor 808 may then load the instructions from memory 820 to an internal register or internal cache. To execute the instructions, processor 808 may retrieve the instructions from the internal register or internal cache and decode them. During or after execution of the instructions, processor 808 may write one or more results (which may be intermediate or final results) to the internal register or internal cache. Processor 808 may then write one or more of those results to memory 820. In particular embodiments, processor 808 may execute only instructions in one or more internal registers or internal caches or in memory 820 (as opposed to storage 810 or elsewhere) and may operate only on data in one or more internal registers or internal caches or in memory 820 (as opposed to storage 810 or elsewhere).

In particular embodiments, storage 810 may include mass storage for data or instructions. For example, in various embodiments, storage 810 can store configurations such as the configurations 218 of FIG. 2. As an example, and not by way of limitation, storage 810 may include a hard disk drive (HDD), a floppy disk drive, flash memory, an optical disc, a magneto-optical disc, magnetic tape, or a Universal Serial Bus (USB) drive or a combination of two or more of these. Storage 810 may include removable or non-removable (or fixed) media, where appropriate. Storage 810 may be internal or external to the computer system 800, where appropriate. In particular embodiments, storage 810 may be non-volatile, solid-state memory. In particular embodiments, storage 810 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 810 may take any suitable physical form and may include any suitable number or type of storage. Storage 810 may include one or more storage control units facilitating communication between processor 808 and storage 810, where appropriate.

In particular embodiments, interface 806 may include hardware, encoded software, or both providing one or more interfaces for communication (such as, for example, packet-based communication) among any networks, any network devices and/or any other computer systems. As an example, and not by way of limitation, communication interface 806 may include a network interface controller (NIC) or network adapter for communicating with an Ethernet or other wire-based network and/or a wireless NIC (WNIC) or wireless adapter for communicating with a wireless network.

Depending on the embodiment, interface 806 may be any type of interface suitable for any type of network for which computer system 800 is used. As an example, and not by way of limitation, computer system 800 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 800 may include any suitable interface 806 for any one or more of these networks, where appropriate.

In some embodiments, interface 806 may include one or more interfaces for one or more I/O devices. One or more of these I/O devices may enable communication between a person and the computer system 800. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 806 for them. Where appropriate, interface 806 may include one or more drivers enabling processor 808 to drive one or more of these I/O devices. Interface 806 may include one or more interfaces 806, where appropriate.

Bus 804 may include any combination of hardware, software embedded in a computer readable medium and/or encoded logic incorporated in hardware or otherwise stored (e.g., firmware) to couple components of the computer system 800 to each other. As an example, and not by way of limitation, bus 804 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 804 may include any number, type and/or configuration of buses 804, where appropriate. In particular embodiments, one or more buses 804 (which may each include an address bus and a data bus) may couple processor 808 to memory 820. Bus 804 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 808 (such as, for example, one or more internal registers or caches), one or more portions of memory 820, one or more portions of storage 810, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of securing one or more machine learning models, the method comprising, by a computer system:
   intercepting machine learning (ML) input data before the ML input data flows into a ML model;
   scanning the ML input data against a plurality of ML threat signatures, the scanning yielding at least a first result, the scanning comprising clustering at least a portion of the ML input data into a plurality of clusters comprising a first independent set of clusters and a second independent set of clusters, wherein:
      the first independent set of clusters corresponds to clusters of values of a first variable in the ML input data; and
      the second independent set of clusters corresponds to clusters of values of a second variable in the ML input data;
   examining a correlation between the values of the first and second variables in the ML input data, the examining yielding at least a second result;
   validating at least one of the first and second results via a variability analysis of error instances in the ML input data, the validating yielding at least a third result; and
   applying thresholding to the ML input data via the third result, wherein the applying thresholding results in at least a portion of the ML input data being filtered.

2. The method of claim 1, comprising allowing particular data of the ML input data which is not filtered to flow into the ML model.

3. The method of claim 1, wherein the scanning comprises:
   measuring a degree of match between the plurality of clusters and the plurality of ML threat signatures; and
   deriving a confidence score based at least partly on the measuring, wherein the at least a first result comprises the confidence score.

4. The method of claim 1, wherein the validating comprises:
   consolidating the at least a first result, the at least a second result, and the at least a third result;
   identifying error instances in the input data using a result of the consolidating; and
   testing the identified error instances for at least one of homoscedasticity and heteroscedasticity.

5. The method of claim 4, comprising:
   wherein the testing comprises testing the identified error instances for heteroscedasticity; and
   applying at least one correction.

6. A system comprising a processor and memory, wherein the processor and memory in combination are operable to implement a method comprising:
   intercepting machine learning (ML) input data before the ML input data flows into a ML model;
   scanning the ML input data against a plurality of ML threat signatures, the scanning yielding at least a first result, the scanning comprising clustering at least a portion of the ML input data into a plurality of clusters comprising a first independent set of clusters and a second independent set of clusters, wherein:
      the first independent set of clusters corresponds to clusters of values of a first variable in the ML input data; and
      the second independent set of clusters corresponds to clusters of values of a second variable in the ML input data;
   examining a correlation between the values of the first and second variables in the ML input data, the examining yielding at least a second result;
   validating at least one of the first and second results via a variability analysis of error instances in the ML input data, the validating yielding at least a third result; and
   applying thresholding to the ML input data via the third result, wherein the applying thresholding results in at least a portion of the ML input data being filtered.

7. The system of claim 6, the method comprising allowing particular data of the ML input data which is not filtered to flow into the ML model.

8. The system of claim 6, wherein the scanning comprises:
measuring a degree of match between the plurality of clusters and the plurality of ML threat signatures; and
deriving a confidence score based at least partly on the measuring, wherein the at least a first result comprises the confidence score.

9. The system of claim 6, wherein the validating comprises:
consolidating the at least a first result, the at least a second result, and the at least a third result;
identifying error instances in the input data using a result of the consolidating; and
testing the identified error instances for at least one of homoscedasticity and heteroscedasticity.

10. The system of claim 9, the method comprising:
wherein the testing comprises testing the identified error instances for heteroscedasticity; and
applying at least one correction.

11. The system of claim 6, wherein the examining comprises:
measuring the correlation between the values of the first and second variables in the ML input data;
determining first and second means in relation to the first and second variables;
determining first and second standard deviations in relation to the first and second variables;
determining first and second data scores in relation to the first and second variables using the first and second means and the first and second standard deviations;
executing bootstrapping with respect to the ML input data, the executing comprising successively generating a plurality of random samples and measuring, within each random sample, a correlation between sample values of the first and second variables; and
generating a confidence interval for the measured correlation using the measured correlation from at least some of the plurality of random samples.

12. A computer-program product comprising a non-transitory computer-usable medium having computer-readable program code embodied therein, the computer-readable program code adapted to be executed to implement a method comprising:
intercepting machine learning (ML) input data before the ML input data flows into a ML model;
scanning the ML input data against a plurality of ML threat signatures, the scanning yielding at least a first result;
examining a correlation between values of first and second variables in the ML input data, the examining yielding at least a second result;
validating at least one of the first and second results via a variability analysis of error instances in the ML input data, the validating yielding at least a third result; and
applying thresholding to the ML input data via the third result, wherein the applying thresholding results in at least a portion of the ML input data being filtered.

13. The computer-program product of claim 12, the method comprising allowing particular data of the ML input data which is not filtered to flow into the ML model.

14. A method of securing one or more machine learning models, the method comprising, by a computer system:
intercepting machine learning (ML) input data before the ML input data flows into a ML model;
scanning the ML input data against a plurality of ML threat signatures, the scanning yielding at least a first result, the scanning comprising clustering at least a portion of the ML input data into a plurality of clusters comprising a first independent set of clusters and a second independent set of clusters, wherein:
the first independent set of clusters corresponds to clusters according a first cluster analysis algorithm; and
the second independent set of clusters corresponds to clusters according to a second cluster analysis algorithm different from the first cluster analysis algorithm;
examining a correlation between values of first and second variables in the ML input data, the examining yielding at least a second result;
validating at least one of the first and second results via a variability analysis of error instances in the ML input data, the validating yielding at least a third result; and
applying thresholding to the ML input data via the third result, wherein the applying thresholding results in at least a portion of the ML input data being filtered.

15. The method of claim 14, wherein:
the first cluster analysis algorithm comprises k-means clustering; and
the second cluster analysis algorithm comprises density-based spatial clustering with noise.

16. The method of claim 14, comprising allowing particular data of the ML input data which is not filtered to flow into the ML model.

17. The method of claim 14, wherein the scanning comprises:
measuring a degree of match between the plurality of clusters and the plurality of ML threat signatures; and
deriving a confidence score based at least partly on the measuring, wherein the at least a first result comprises the confidence score.

18. A method of securing one or more machine learning models, the method comprising, by a computer system:
intercepting machine learning (ML) input data before the ML input data flows into a ML model;
scanning the ML input data against a plurality of ML threat signatures, the scanning yielding at least a first result;
examining a correlation between values of first and second variables in the ML input data, the examining yielding at least a second result, the examining comprising:
measuring the correlation between the values of the first and second variables in the ML input data;
determining first and second means in relation to the first and second variables;
determining first and second standard deviations in relation to the first and second variables;
determining first and second data scores in relation to the first and second variables using the first and second means and the first and second standard deviations;
executing bootstrapping with respect to the ML input data, the executing comprising successively generating a plurality of random samples and measuring, within each random sample, a correlation between sample values of the first and second variables; and
generating a confidence interval for the measured correlation using the measured correlation from at least some of the plurality of random samples;

validating at least one of the first and second results via a variability analysis of error instances in the ML input data, the validating yielding at least a third result; and applying thresholding to the ML input data via the third result, wherein the applying thresholding results in at least a portion of the ML input data being filtered.

19. The method of claim 18, where the examining comprises:

deriving first and second margins of error in relation to the first and second variables; and generating confidence scores for at least a portion of the values of the first and second variables.

20. The method of claim 18, wherein the measuring the correlation between the values of the first and second variables in the ML input data comprises utilizing Pearson's correlation coefficient.

* * * * *